US009588555B2

(12) United States Patent
Archer et al.

(10) Patent No.: US 9,588,555 B2
(45) Date of Patent: Mar. 7, 2017

(54) MANAGING COOLING OPERATIONS IN A PARALLEL COMPUTER COMPRISING A PLURALITY OF COMPUTE NODES

(71) Applicant: GLOBALFOUNDRIES INC., Grand Cayman (KY)

(72) Inventors: Charles J. Archer, Rochester, MN (US); Bin Cao, Rochester, MN (US); Phillip V. Mann, Rochester, MN (US)

(73) Assignee: Globalfoundries Inc., Grand Cayman (KY)

( * ) Notice: Subject to any disclaimer, the term of this patent is extended or adjusted under 35 U.S.C. 154(b) by 647 days.

(21) Appl. No.: 13/973,608

(22) Filed: Aug. 22, 2013

(65) Prior Publication Data
US 2015/0057829 A1   Feb. 26, 2015

(51) Int. Cl.
G06F 1/20 (2006.01)
(52) U.S. Cl.
CPC .................. G06F 1/206 (2013.01)
(58) Field of Classification Search
CPC ... G06F 1/206; G06F 1/20; G06F 9/50; G06F 9/5011; G06F 2200/201; G06F 1/00
See application file for complete search history.

(56) References Cited

U.S. PATENT DOCUMENTS

| 7,953,957 | B2 | 5/2011 | Gooding et al. |
| 8,365,176 | B2 | 1/2013 | Campbell et al. |
| 8,397,087 | B1 | 3/2013 | Gardner et al. |
| 8,397,088 | B1 | 3/2013 | Ghose |
| 2005/0216222 | A1* | 9/2005 | Inoue ...................... G06F 1/206 702/136 |
| 2010/0122256 | A1 | 5/2010 | Darrington et al. |
| 2010/0257531 | A1* | 10/2010 | Barsness ............... G06F 9/4893 718/102 |
| 2011/0267197 | A1* | 11/2011 | Archer .................... G06F 1/206 340/584 |
| 2012/0158206 | A1* | 6/2012 | Longobardi ......... G05B 13/048 700/300 |
| 2013/0063450 | A1 | 3/2013 | Kabawala |
| 2013/0111492 | A1* | 5/2013 | Nojiri ..................... G06F 1/206 718/104 |

* cited by examiner

Primary Examiner — Nathan L Laughlin
(74) Attorney, Agent, or Firm — DeLio, Peterson & Curcio, LLC; Peter W. Peterson

(57) ABSTRACT

Managing cooling operations in a parallel computer comprising a plurality of compute nodes, including: receiving, by a target compute node from an origin compute node, a message; identifying, by the target compute node, one or more characteristics of the message; and controlling, by the target compute node, cooling operations in dependence upon the one or more characteristics of the message.

15 Claims, 8 Drawing Sheets

US 9,588,555 B2

MANAGING COOLING OPERATIONS IN A PARALLEL COMPUTER COMPRISING A PLURALITY OF COMPUTE NODES

BACKGROUND OF THE INVENTION

Field of the Invention

The field of the invention is data processing, or, more specifically, methods, apparatus, and products for managing cooling operations in a parallel computer comprising a plurality of compute nodes.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination. Parallel computers can include a plurality of nodes that include component parts that produce heat. In order to ensure optimal operation of the parallel computer, such component parts need to be cooled.

SUMMARY OF THE INVENTION

Methods, apparatus, and products for managing cooling operations in a parallel computer comprising a plurality of compute nodes are disclosed in this specification. Managing cooling operations in a parallel computer comprising a plurality of compute nodes can include receiving, by a target compute node from an origin compute node, a message; identifying, by the target compute node, one or more characteristics of the message; and controlling, by the target compute node, cooling operations in dependence upon the one or more characteristics of the message.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
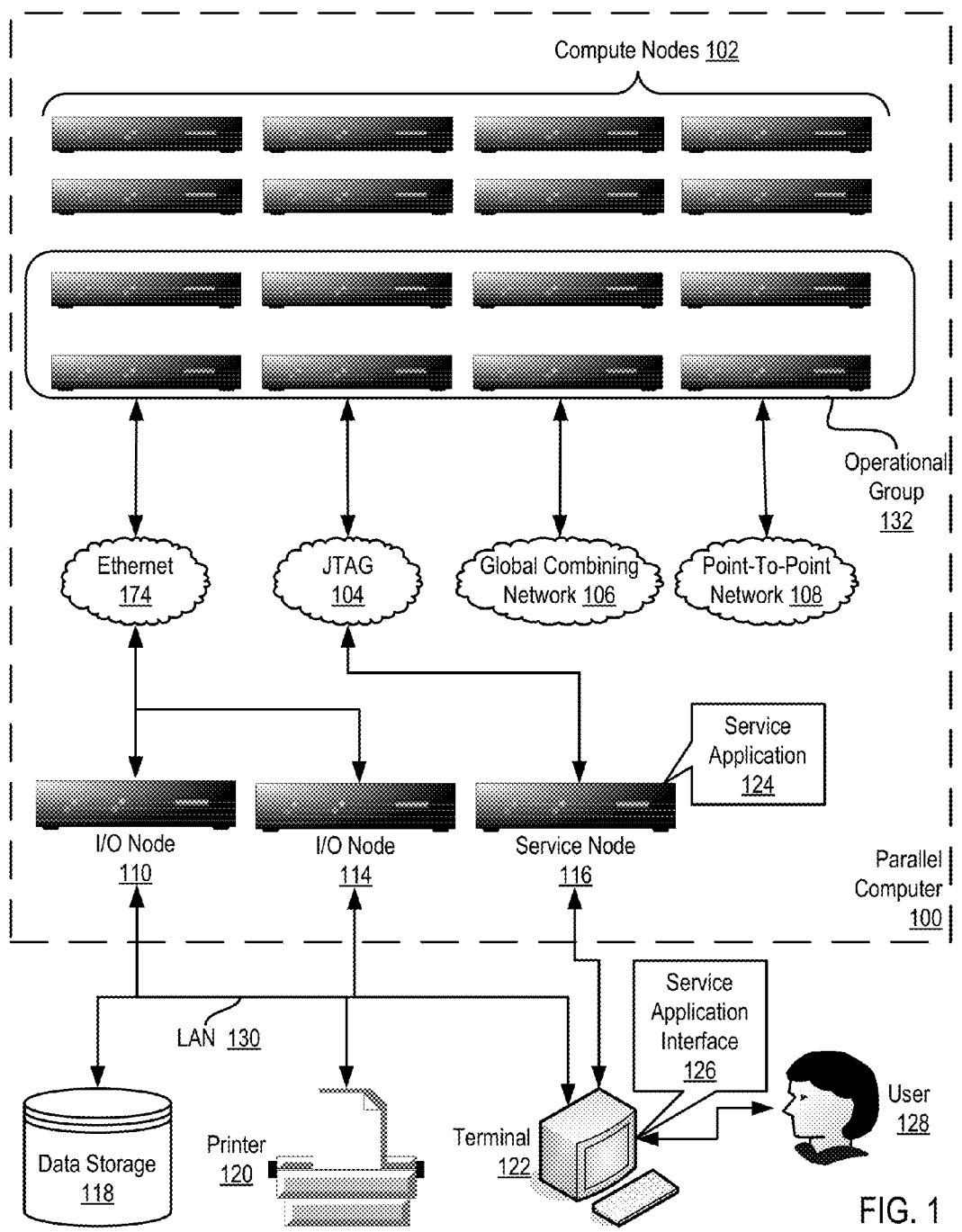
FIG. 1 illustrates an exemplary system for managing cooling operations in a parallel computer comprising a plurality of compute nodes according to embodiments of the present invention.

Exemplary methods, apparatus, and products for managing cooling operations in a parallel computer comprising a plurality of compute nodes in accordance with the present invention are described with reference to the accompanying drawings, beginning with FIG. 1. FIG. 1 illustrates an exemplary system for managing cooling operations in a parallel computer comprising a plurality of compute nodes according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount * N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the receive buffer of the root process. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for managing cooling operations in accordance with embodiments of the present invention. Managing cooling operations in accordance with embodiments of the present invention can include receiving, by a target compute node from an origin compute node, a message. Managing cooling operations in accordance with embodiments of the present invention can further include identifying, by the target compute node, one or more characteristics of the message. Managing cooling operations in accordance with embodiments of the present invention can further include controlling, by the target compute node, cooling operations in dependence upon the one or more characteristics of the message.

Managing cooling operations according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of managing cooling operations according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
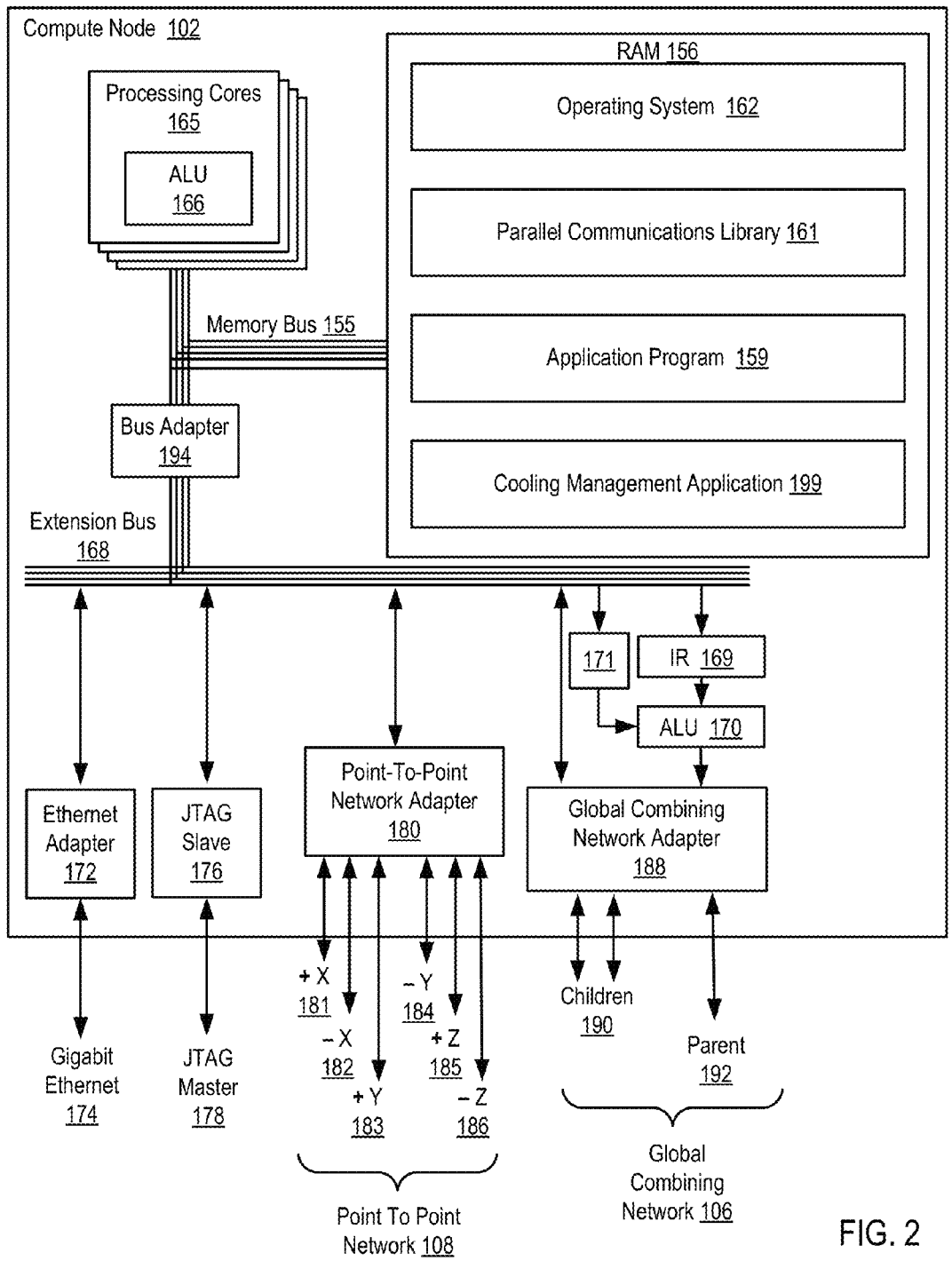
FIG. 2 sets forth a block diagram of an example compute node useful in a parallel computer capable of managing cooling operations according to embodiments of the present invention.

Also stored RAM (156) is a cooling management application (199). The cooling management application (199) may be embodied as a module of computer program instructions for managing cooling operations in a parallel computer comprising a plurality of compute nodes according to embodiments of the present application. In the example of FIG. 2, the cooling management module (199) may be configured to receive a message, identify one or more characteristics of the message, and control cooling operations in dependence upon the one or more characteristics of the message as described in greater detail below.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for managing cooling operations in a parallel computer comprising a plurality of compute nodes include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for managing cooling operations according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3:
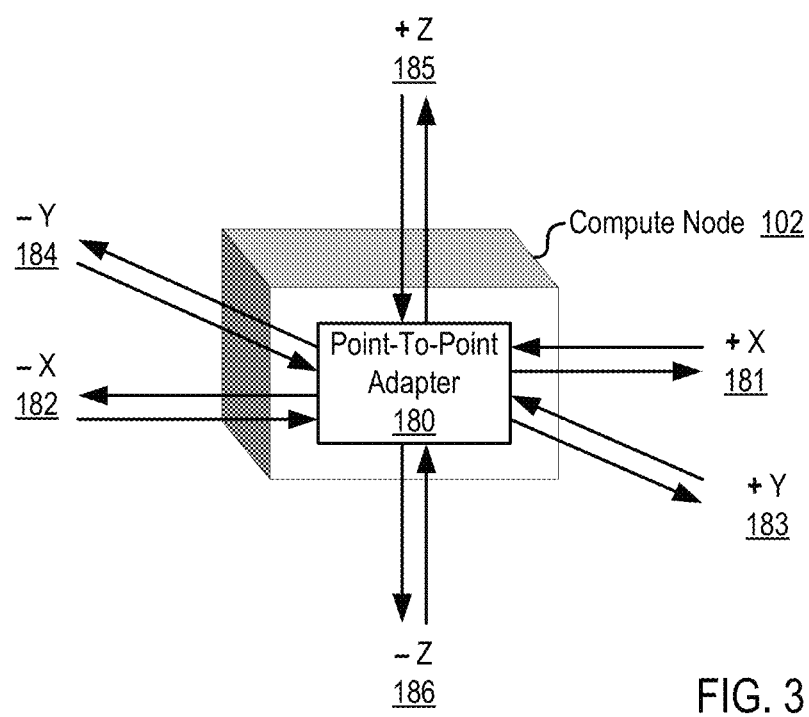
FIG. 3 sets forth a block diagram of an example Point-To-Point Adapter useful in systems for managing cooling operations in a parallel computer comprising a plurality of compute nodes according to embodiments of the present invention.

For further explanation, FIG. 3 sets forth a block diagram of an example Point-To-Point Adapter (180) useful in systems for managing cooling operations in a parallel computer comprising a plurality of compute nodes according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3 provides data communication along an x-axis through four unidirectional data communications links, to and from the next node in the −x direction (182) and to and from the next node in the +x direction (181). The Point-To-Point Adapter (180) of FIG. 3 also provides data communication along a y-axis through four unidirectional data communications links, to and from the next node in the −y direction (184) and to and from the next node in the +y direction (183). The Point-To-Point Adapter (180) of FIG. 3 also provides data communication along a z-axis through four unidirectional data communications links, to and from the next node in the −z direction (186) and to and from the next node in the +z direction (185).

Figure 4:
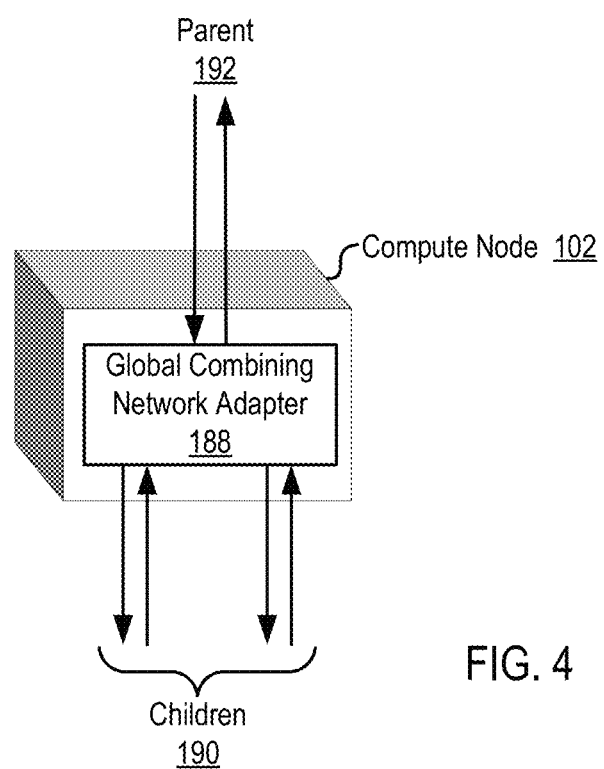
FIG. 4 sets forth a block diagram of an example Global Combining Network Adapter useful in systems for managing cooling operations in a parallel computer comprising a plurality of compute nodes according to embodiments of the present invention.

For further explanation, FIG. 4 sets forth a block diagram of an example Global Combining Network Adapter (188) useful in systems for managing cooling operations in a parallel computer comprising a plurality of compute nodes according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 4 provides data communication to and from children nodes of a global combining network through four unidirectional data communications links (190), and also provides data communication to and from a parent node of the global combining network through two unidirectional data communications links (192).

Figure 5:
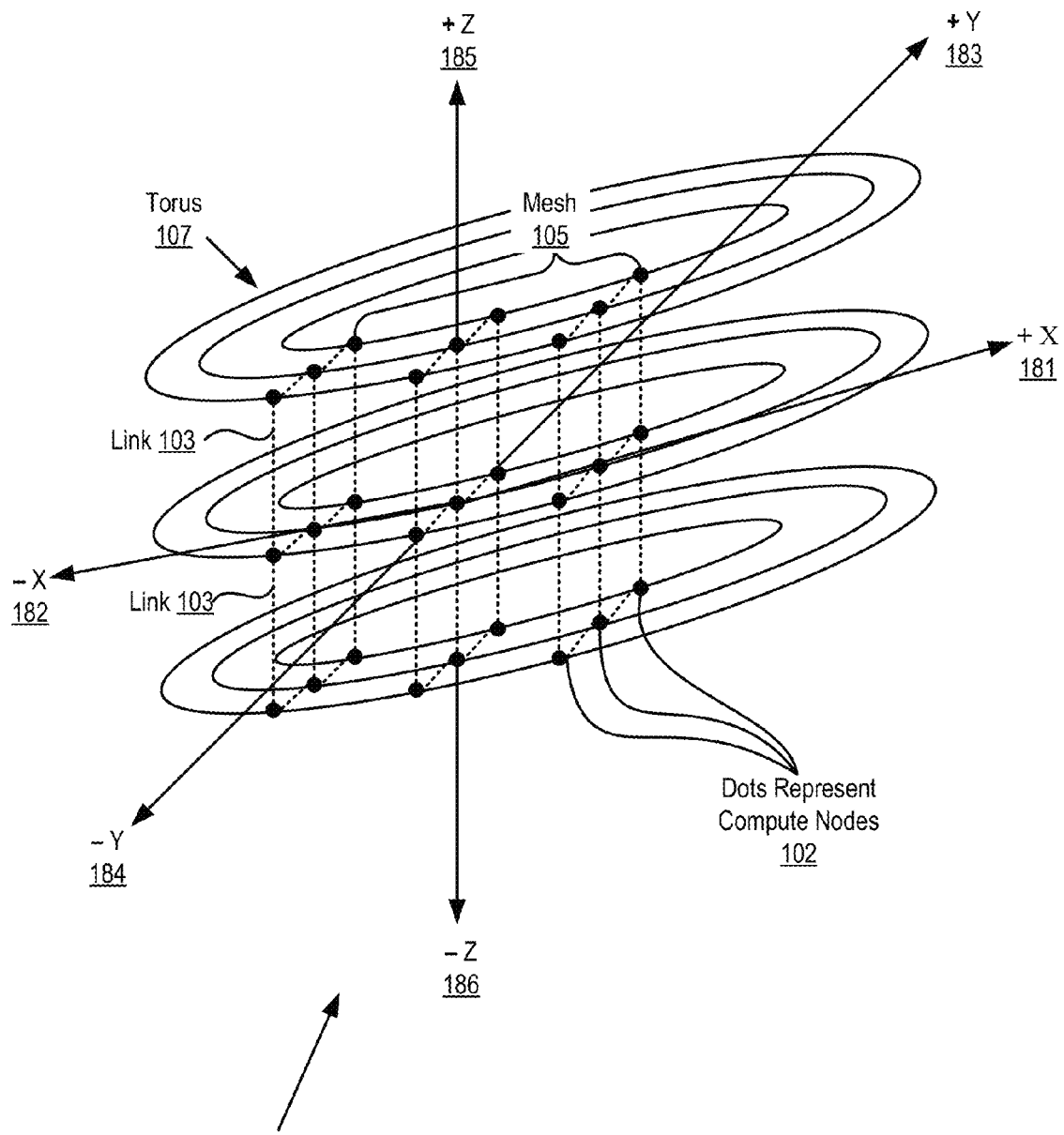
FIG. 5 sets forth a line drawing illustrating an example data communications network optimized for point-to-point operations useful in systems capable of managing cooling operations in a parallel computer comprising a plurality of compute nodes according to embodiments of the present invention.

For further explanation, FIG. 5 sets forth a line drawing illustrating an example data communications network (108) optimized for point-to-point operations useful in systems capable of managing cooling operations in a parallel computer comprising a plurality of compute nodes according to embodiments of the present invention. In the example of FIG. 5, dots represent compute nodes (102) of a parallel computer, and the dotted lines between the dots represent data communications links (103) between compute nodes. The data communications links are implemented with point-to-point data communications adapters similar to the one illustrated for example in FIG. 3, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 5 is illustrated with only 27 compute nodes, but readers will recognize that a data communications network optimized for point-to-point operations for use in managing cooling operations in a parallel computer comprising a plurality of compute nodes in accordance with embodiments of the present invention may contain only a few compute nodes or may contain thousands of compute nodes. For ease of explanation, the data communications network of FIG. 5 is illustrated with only three dimensions, but readers will recognize that a data communications network optimized for point-to-point operations for use in managing cooling operations in a parallel computer comprising a plurality of compute nodes in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 6:
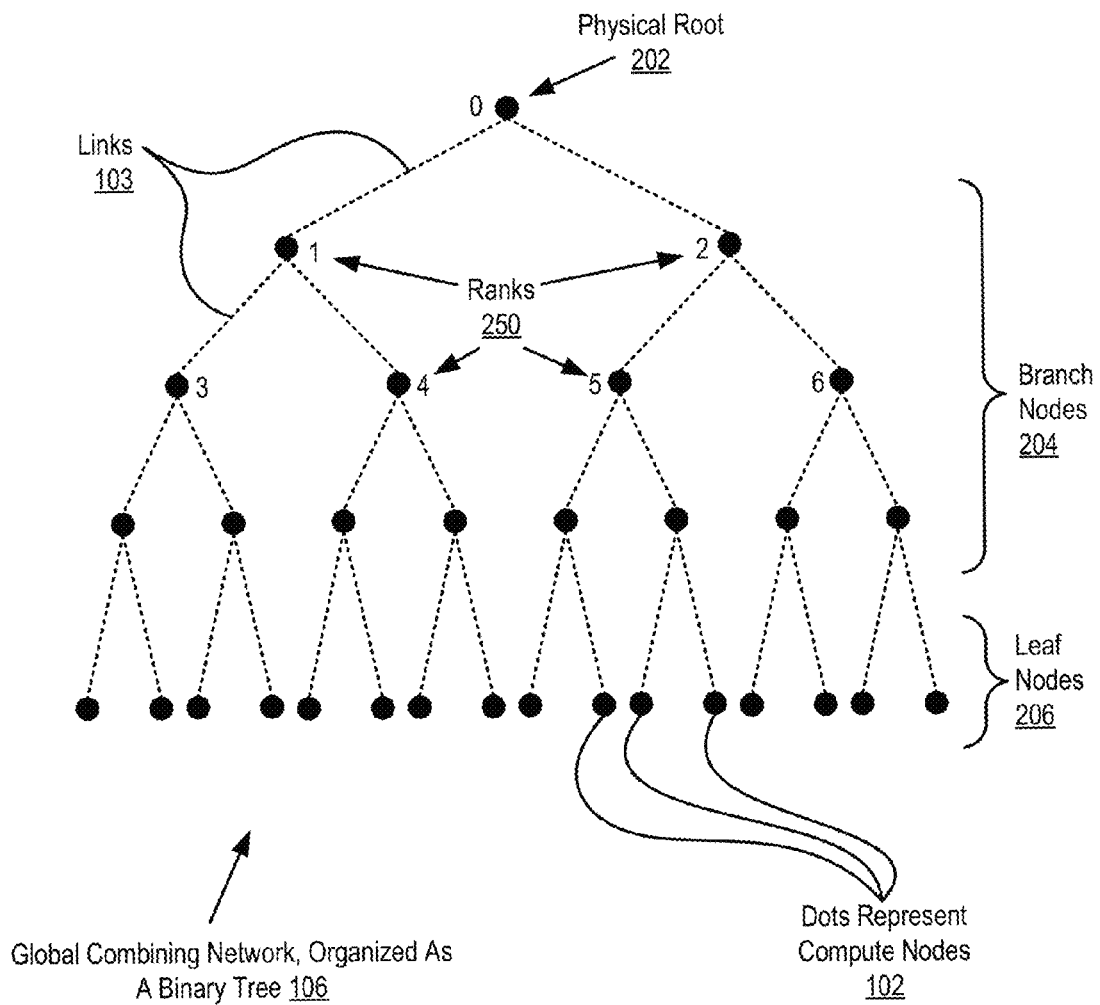
FIG. 6 sets forth a line drawing illustrating an example global combining network useful in systems capable of managing cooling operations in a parallel computer comprising a plurality of compute nodes according to embodiments of the present invention.

For further explanation, FIG. 6 sets forth a line drawing illustrating an example global combining network (106) useful in systems capable of managing cooling operations in a parallel computer comprising a plurality of compute nodes according to embodiments of the present invention. The example data communications network of FIG. 6 includes data communications links (103) connected to the compute nodes so as to organize the compute nodes as a tree. In the example of FIG. 6, dots represent compute nodes (102) of a parallel computer, and the dotted lines (103) between the dots represent data communications links between compute nodes. The data communications links are implemented with global combining network adapters similar to the one illustrated for example in FIG. 4, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 6 is illustrated with only 31 compute nodes, but readers will recognize that a global combining network (106) optimized for collective operations for use in managing cooling operations in a parallel computer comprising a plurality of compute nodes in accordance with embodiments of the present invention may contain only a few compute nodes or may contain thousands of compute nodes.

In the example of FIG. 6, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 7:
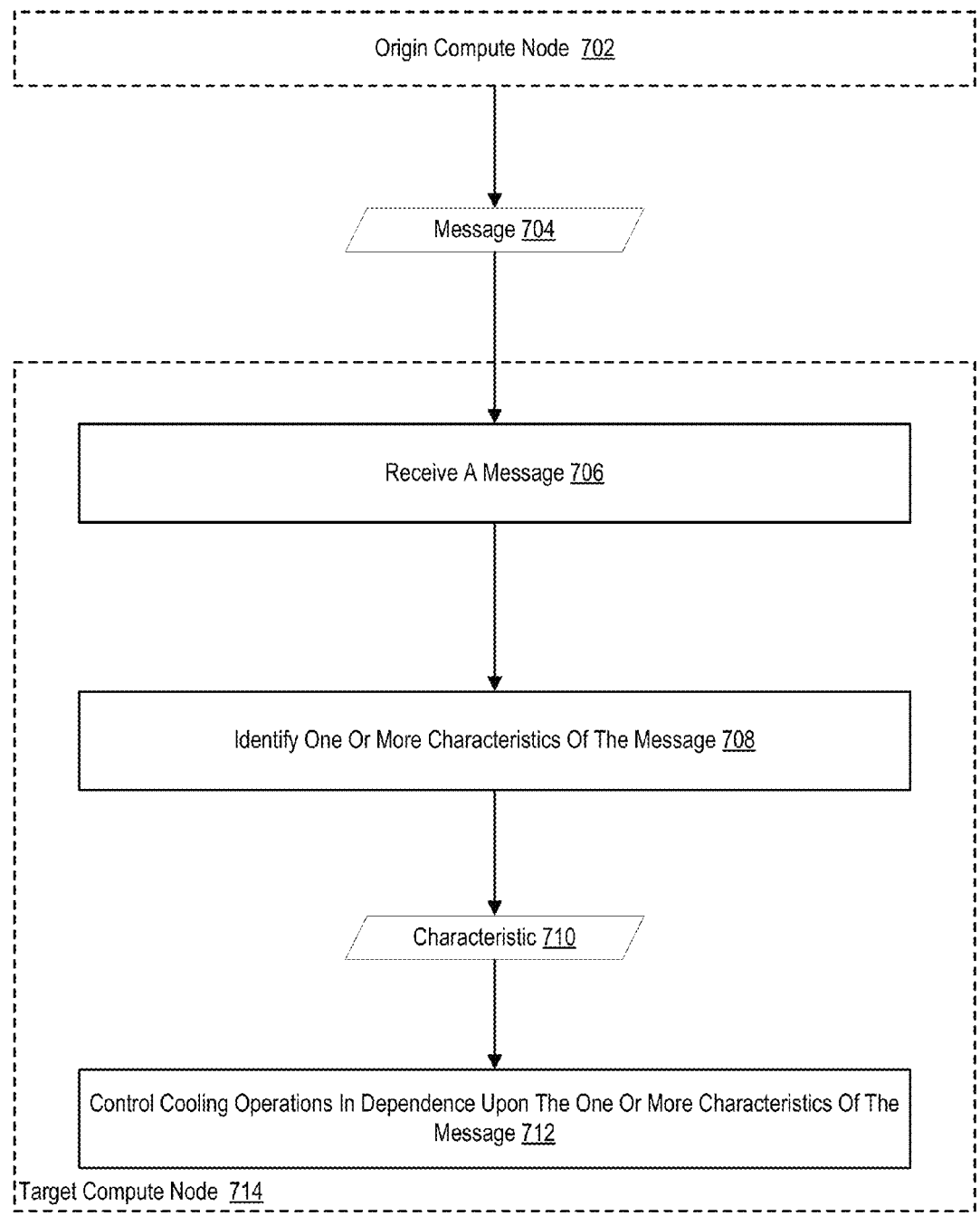
FIG. 7 sets forth a flow chart illustrating an example method for managing cooling operations in a parallel computer comprising a plurality of compute nodes according to embodiments of the present invention.

For further explanation, FIG. 7 sets forth a flow chart illustrating an example method managing cooling operations in a parallel computer comprising a plurality of compute nodes (702, 714) according to embodiments of the present invention. Although not illustrated in FIG. 7, the compute nodes (702, 714) of FIG. 7 may be included in a parallel computer as described above and depicted with respect to FIG. 1. As such, the compute nodes (702, 714) illustrated in FIG. 7 may be coupled for data communications via one or more of the data communications networks described above with reference to FIGS. 1-6.

The example method of FIG. 7 includes receiving (706), by a target compute node (714) from an origin compute node (702), a message (704). In the example method of FIG. 7, the message (704) may be generated by the origin compute node (702) and transmitted to the target compute node (714) via one or more data communications networks. In such an example, the message (704) may represent a request or instruction to carry out some operation on the target compute node (714). For example, the message (714) may represent an instruction to write data to memory in the target compute node (714), the message (714) may represent an instruction to read data from memory in the target compute node (714), the message (714) may represent an instruction to perform a computational task on the target compute node (714), and so on.

The example method of FIG. 7 also includes identifying (708), by the target compute node (714), one or more characteristics (710) of the message (704). In the example method of FIG. 7, a 'characteristic' of the message (704) may include any information contained in the message (704) that may be used to determine which components within the target compute node (714) will be utilized in response to receiving the message (704). For example, the one or more characteristics (710) of the message (704) may include information identifying the nature of an operation to be performed by the target compute node (714) in response to receiving the message (704), information identifying the amount of data to be transferred to or from the target compute node (714) in response to receiving the message (704), information identifying components within the target compute node (714) that will be utilized in response to receiving the message (704), and so on.

Consider an example in which the one or more characteristics (710) of the message (704) indicate that the message (704) is a request to perform a floating point operation on the target compute node (714). In such an example, the one or more characteristics (710) of the message (704) can include information that may be used to determine which components within the target compute node (714) will be utilized in response to receiving the message (704). In such an example, the one or more characteristics (710) of the message (704) indicate that computer hardware used to accelerate floating point operations is about to be utilized in response to receiving the message (704). Alternatively, if the one or more characteristics (710) of the message (704) include information indicating that the message (704) represents an instruction to process and display a digital image, the one or more characteristics (710) of the message (704) indicate that a graphics processing unit ('GPU') is about to be utilized in response to receiving the message (704).

The example method of FIG. 7 also includes controlling (712), by the target compute node (714), cooling operations in dependence upon the one or more characteristics (710) of the message (714). In the example method of FIG. 7, controlling (712) cooling operations may be carried out, for example, by powering on one or more fans, by powering off one or more fans, by enabling the flow of water through a liquid cooling system, and so on. Controlling (712) cooling operations in dependence upon the one or more characteristics (710) of the message (714) may be carried out, for example, by controlling the operation of cooling components that are associated with components within the target compute node (714) will be utilized in response to receiving the message (704).

Consider the example described above in which the one or more characteristics (710) of the message (704) indicate that the message (704) is a request to perform a floating point operation on the target compute node (714), such that the one or more characteristics (710) of the message (704) indicate that computer hardware used to accelerate floating point operations is about to be utilized in response to receiving the message (704). In such an example, controlling (712) cooling operations in dependence upon the one or more characteristics (710) of the message (714) may be carried out, for example, by powering on a fan that is located so as to deliver airflow to the computer hardware used to accelerate floating point operations. Alternatively, in the example described above in which the one or more characteristics (710) of the message (704) include information indicating that the message (704) represents an instruction to process and display a digital image, controlling (712) cooling operations in dependence upon the one or more characteristics (710) of the message (714) may be carried out by powering on a fan that is located so as to deliver airflow to the GPU.

Figure 8:
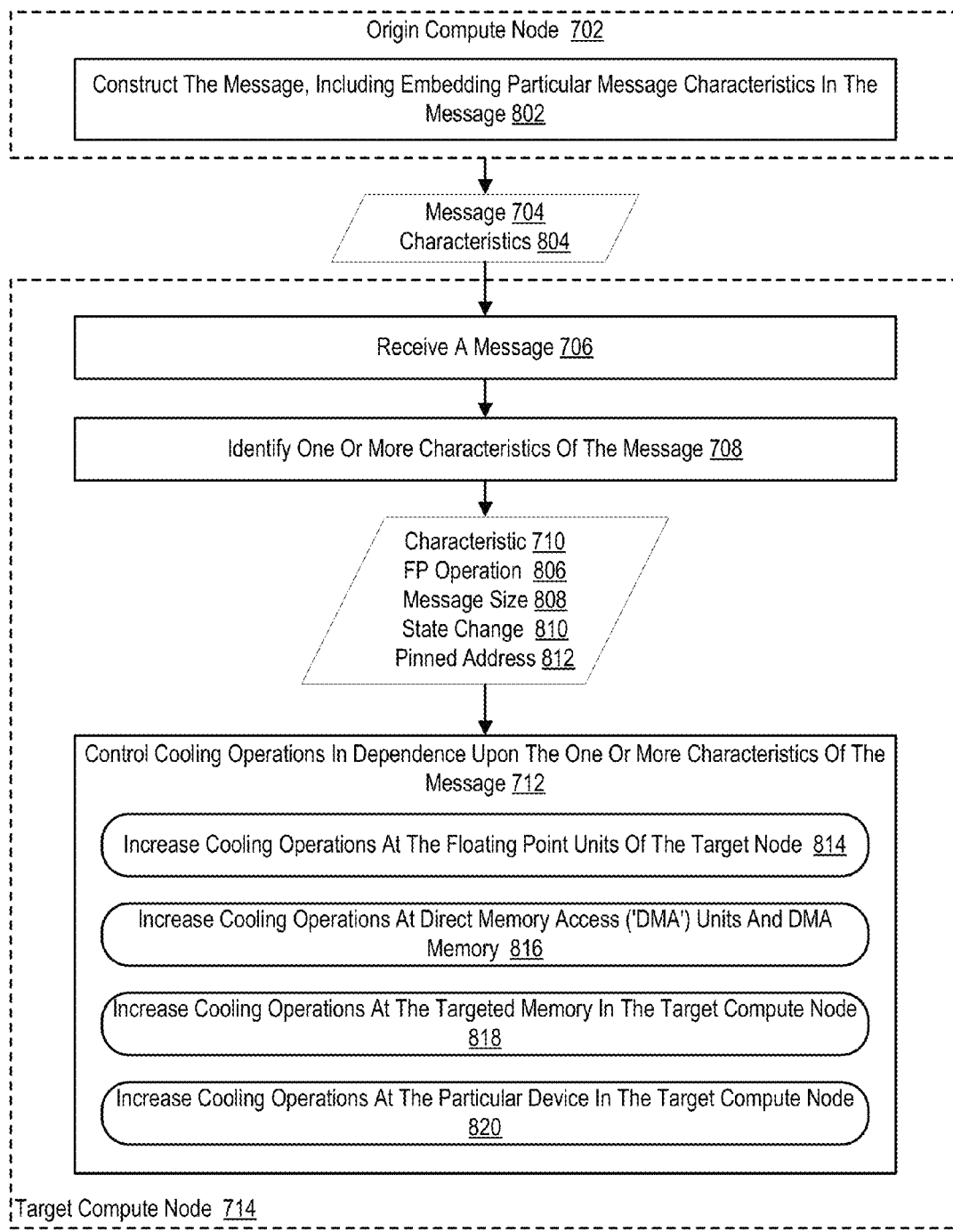
FIG. 8 sets forth a flow chart illustrating an additional example method for managing cooling operations in a parallel computer comprising a plurality of compute nodes according to embodiments of the present invention.

For further explanation, FIG. 8 sets forth a flow chart illustrating an additional example method managing cooling operations in a parallel computer comprising a plurality of compute nodes (702, 714) according to embodiments of the present invention. The example method of FIG. 8 is similar to the example method of FIG. 7, as it also includes receiving (706) a message (704), identifying (708) one or more characteristics (710) of the message (704), and controlling (712) cooling operations in dependence upon the one or more characteristics (710) of the message (714). Although not illustrated in FIG. 8, the compute nodes (702, 714) of FIG. 8 may be included in a parallel computer as described above and depicted with respect to FIG. 1. As such, the compute nodes (702, 714) illustrated in FIG. 8 may be coupled for data communications via one or more of the data communications networks described above with reference to FIGS. 1-6.

The example method of FIG. 8 also includes constructing (802), by the origin compute node (702), the message (704). In the example method of FIG. 8, constructing (802) the message (704) includes embedding particular message characteristics (804) in the message (704). Such message characteristics (804) may be embodied, for example, as a value representing the type of instruction contained in the message (704), the amount of data to be transferred between the origin compute node (702) and the target compute node (714), and any other information useful in identifying the components of the target compute node (714) that will utilized in response to receiving the message (704). In the example method of FIG. 8, embedding particular message characteristics (804) in the message (704) may be carried out by including identifiers representing the type of instruction contained in the message (704), the amount of data to be transferred between the origin compute node (702) and the target compute node (714), and any other information useful in identifying the components of the target compute node (714) that will utilized in response to receiving the message (704) in the header of the message (704).

In the example method of FIG. 8, the one or more characteristics (710) of the message (704) can indicate a request to carry out floating point operations (806) by the target node (714). In the example method of FIG. 8, the message (704) can include an operation code ('opcode') identifying the nature of the operation to be performed by the target compute node (714) in response to receiving the message (704). As such, determining that the one or more characteristics (710) of the message (704) indicate a request to carry out floating point operations (806) may be carried out by extracting the opcode contained in the message (704) and comparing the opcode to an opcode table or other repository to identify the type of operation to be performed by the target compute node (714) in response to receiving the message (704).

In the example method of FIG. 8, controlling (712) cooling operations in dependence upon the one or more characteristics (710) of the message (714) may therefore include increasing (814) cooling operations at the floating point units of the target compute node (714). In the example method of FIG. 8, the floating point units of the target compute node (714) may be embodied, for example, as computer hardware used to accelerate floating point operations. In such an example, when the one or more characteristics (710) of the message (704) indicate a request to carry out floating point operations (806) by the target node (714), the target compute node (714) can determine that the floating point units are about to be utilized in response to receiving the message (704). As such, increasing (814) cooling operations at the floating point units of the target compute node (714) can be useful in dissipating heat that will be generated by the floating point units as part of executing such floating point operations. In the example method of FIG. 8, increasing (814) cooling operations at the floating point units of the target compute node (714) may be carried out, for example, by powering on fans located to deliver airflow to the floating point units, by increasing the fan speed of fans located to deliver airflow to the floating point units, and so on.

In the example method of FIG. 8, the one or more characteristics (710) of the message (704) can also include a message size (808) that is greater than a predefined threshold. In the example method of FIG. 8, the message size (808) can represent the amount of data to be transferred between the origin compute node (702) and the target compute node (714). For example, if the message (704) includes a read instruction, the message size (808) can represent the amount of data to be transferred from the target compute node (714) to the origin compute node (702). Alternatively, if the message (704) includes a write instruction, the message size (808) can represent the amount of data to be transferred from origin compute node (704) to the target compute node (714). When the message size (808) that is greater than a predefined threshold, the target compute node (714) can use this information to determine that computer hardware within the target compute node (714) that is used to transfer data between the origin compute node (702) and the target compute node (714) will be utilized.

In the example method of FIG. 8, controlling (712) cooling operations in dependence upon the one or more characteristics (710) of the message (714) may therefore include increasing (816) cooling operations at direct memory access ('DMA') units on the target compute node (714) and DMA memory on the target compute node (714). In the example method of FIG. 8, DMA units on the target compute node (714) may be embodied as computer hardware for carrying out DMA operations between the origin compute node (702) and the target compute node (714). In carrying out DMA operations between the origin compute node (702) and the target compute node (714), DMA units on the origin compute node (702) may write data directly into DMA memory on the target compute node (714) and DMA units on the target compute node (714) may write data directly into DMA memory on the origin compute node (702). In such a way, data transfer operations occur through special purpose DMA units and DMA memory on each of the compute nodes (702, 714). When the message size (808) of a pending data transfer is greater than a predefined threshold, the target compute node (714) may therefore increase (816) cooling operations at DMA units on the target compute node (714) and DMA memory on the target compute node (714). In the example method of FIG. 8, increasing (816) cooling operations at DMA units on the target compute node (714) and DMA memory on the target compute node (714) may be carried out, for example, by powering on fans located to deliver airflow to the DMA units and DMA memory on the target compute node (714), by increasing the fan speed of fans located to deliver airflow to the DMA units and DMA memory on the target compute node (714), and so on.

In the example method of FIG. 8, the one or more characteristics (710) of the message (704) can also include values which will cause a number of state changes (810) to targeted memory in the target compute node (714) that is greater than a predefined threshold. In the example method of FIG. 8, targeted memory represents a location in memory that will be targeted by one or more instructions contained in the message (704). Different types of instructions may result in differing amounts of change to targeted memory in the target compute node (714). For example, an instruction to write data to targeted memory in the target compute node (714) will result in more changes to the targeted memory than an instruction to read data from targeted memory in the target compute node (714). In such a way, each type of operation may be associated with a value representing the expected amount of changes to the contents of targeted memory in the target compute node (714) that will be required to execute a particular instruction in response to the message (704). Such a value representing the expected amount of changes to the targeted memory that will be required to carry out the operation may be established, for example, by determining an average number of memory alterations that have occurred during previous instances of executing the operation, by a system administrator setting the value, and in other ways as will occur to those of skill in the art. As such, the target compute node (714) may include a table or other repository that associates an expected number of state changes to memory in the target compute node (714) with an opcode or other identifier of an operation.

In the example method of FIG. 8, controlling (712) cooling operations in dependence upon the one or more characteristics (710) of the message (714) may therefore include increasing (818) cooling operations at the targeted memory in the target compute node (714). In the example method of FIG. 8, when the one or more characteristics (710) of the message (704) include values (e.g., an opcode) which will cause a number of state changes (810) to targeted memory in the target compute node (714) that is greater than a predefined threshold, the target compute node (714) can determine that the targeted memory in the target compute node (714) will be heavily utilized and accessed. As such, cooling operations may need to be increased at the targeted memory. In the example method of FIG. 8, increasing (818) cooling operations at the targeted memory in the target compute node (714) may be carried out, for example, by powering on fans located to deliver airflow to the targeted memory in the target compute node (714), by increasing the fan speed of fans located to deliver airflow to the targeted memory in the target compute node (714), and so on.

In the example method of FIG. 8, the one or more characteristics (710) of the message (704) can also include a memory address (812) in a pinned memory segment of the target compute node (714) that is associated with a particular device in the target compute node (714). In the example method of FIG. 8, a pinned memory segment represents a segment of memory in a first memory device that is never swapped to a slower, second memory device. For example, a pinned segment of RAM may represent a segment of RAM that is never swapped to a hard disk. In such a way, a pinned memory segment of the target compute node (714) that is associated with a particular device in the target compute node (714) represents a segment of memory that is always available for use by the particular device. In the example method of FIG. 8, when the message (704) includes a memory address (812) in a pinned memory segment of the target compute node (714) that is associated with a particular device in the target compute node (714), the target compute node (714) can assume that the device associated with the pinned memory segment of the target compute node (714) will be utilized to execute an instruction contained in the message (704).

In the example method of FIG. 8, controlling (712) cooling operations in dependence upon the one or more characteristics (710) of the message (714) may therefore include increasing (820) cooling operations at the particular device in the target compute node (714). In the example method of FIG. 8, increasing (820) cooling operations at the particular device in the target compute node (714) may be carried out, for example, by powering on fans located to deliver airflow to the device, by increasing the fan speed of fans located to deliver airflow to the device, and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing cooling operations in a parallel computer comprising a plurality of compute nodes, the method comprising:
    receiving, by a target compute node from an origin compute node, a message;
    identifying, by the target compute node, one or more characteristics of the message including a message size representing amount of data to be transferred between the origin compute node and the target compute node, wherein the message size is greater than a predefined threshold; and controlling, by the target compute node, cooling operations in dependence upon the one or more characteristics of the message by increasing cooling operations at direct memory access ('DMA') units on the target compute node and DMA memory on the target compute node.

2. The method of claim 1, wherein:

the one or more characteristics of the message indicate a request to carry out floating point operations by the target compute node; and controlling cooling operations in dependence upon the one or more characteristics of the message further comprises increasing cooling operations at the floating point units of the target compute node.

3. The method of claim 1, further comprising constructing, by the origin compute node, the message, including embedding particular message characteristics in the message.

4. An apparatus for managing cooling operations in a parallel computer comprising a plurality of compute nodes, the apparatus comprising a computer processor, a computer memory operatively coupled to the computer processor, the computer memory having disposed within it computer program instructions that, when executed by the computer processor, cause the apparatus to carry out the steps of:

receiving, by a target compute node from an origin compute node, a message;

identifying, by the target compute node, one or more characteristics of the message including a message size representing amount of data to be transferred between the origin compute node and target compute node, wherein the message size is greater than a predefined threshold; and controlling, by the target compute node, cooling operations in dependence upon the one or more characteristics of the message.

5. The apparatus of claim 4, wherein:

the one or more characteristics of the message indicate a request to carry out floating point operations by the target compute node; and controlling cooling operations in dependence upon the one or more characteristics of the message further comprises increasing cooling operations at the floating point units of the target compute node.

6. The apparatus of claim 4 further comprising computer program instructions that, when executed by the computer processor, cause the apparatus to carry out the step of constructing, by the origin compute node, the message, including embedding particular message characteristics in the message.

7. A computer program product for managing cooling operations in a parallel computer comprising a plurality of compute nodes, the computer program product disposed upon a non-transitory computer readable medium, the computer program product comprising computer program instructions that, when executed, cause a computer to carry out the steps of:

receiving, by a target compute node from an origin compute node, a message;

identifying, by the target compute node, one or more characteristics of the message including a message size representing amount of data to be transferred between the origin compute node and the target compute node, wherein the message size is greater than a predefined threshold; and controlling, by the target compute node, cooling operations in dependence upon the one or more characteristics of the message by increasing cooling operations at direct memory access ('DMA') units on the target compute node and DMA memory on the target compute node.

8. The computer program product of claim 7 wherein:

the one or more characteristics of the message indicate a request to carry out floating point operations by the target compute node; and controlling cooling operations in dependence upon the one or more characteristics of the message further comprises increasing cooling operations at the floating point units of the target compute node.

9. The computer program product of claim 7 further comprising computer program instructions that, when executed, cause the computer to carry out the step of constructing, by the origin compute node, the message, including embedding particular message characteristics in the message.

10. A method of managing cooling operations in a parallel computer comprising a plurality of compute nodes, the method comprising:

receiving, by a target compute node from an origin compute node, a message;

identifying, by the target compute node, one or more characteristics of the message including values which will cause a number of state changes to targeted memory in the target compute node that is greater than a predefined threshold; and controlling, by the target compute node, cooling operations in dependence upon the one or more characteristics of the message by increasing cooling operations at the targeted memory in the target compute node.

11. A method of managing cooling operations in a parallel computer comprising a plurality of compute nodes, the method comprising:

receiving, by a target compute node from an origin compute node, a message;

identifying, by the target compute node, one or more characteristics of the message including a memory address in a pinned memory segment of the target compute node that is associated with a particular device in the target compute node; and controlling, by the target compute node, cooling operations in dependence upon the one or more characteristics of the message by increasing cooling operations at the particular device in the target compute node.

12. An apparatus for managing cooling operations in a parallel computer comprising a plurality of compute nodes, the apparatus comprising a computer processor, a computer memory operatively coupled to the computer processor, the computer memory having disposed within it computer program instructions that, when executed by the computer processor, cause the apparatus to carry out the steps of:

receiving, by a target compute node from an origin compute node, a message;

identifying, by the target compute node, one or more characteristics of the message including values which will cause a number of state changes to targeted memory in the target compute node that is greater than a predefined threshold; and controlling, by the target compute node, cooling operations in dependence upon the one or more characteristics of the message by increasing cooling operations at the targeted memory in the target compute node.

13. An apparatus for managing cooling operations in a parallel computer comprising a plurality of compute nodes, the apparatus comprising a computer processor, a computer memory operatively coupled to the computer processor, the computer memory having disposed within it computer program instructions that, when executed by the computer processor, cause the apparatus to carry out the steps of:

receiving, by a target compute node from an origin compute node, a message;

identifying, by the target compute node, one or more characteristics of the message including a memory address in a pinned memory segment of the target compute node that is associated with a particular device in the target compute node; and controlling, by the target compute node, cooling operations in dependence upon the one or more characteristics of the message by increasing cooling operations at the particular device in the target compute node.

14. A computer program product for managing cooling operations in a parallel computer comprising a plurality of compute nodes, the computer program product disposed upon a non-transitory computer readable medium, the computer program product comprising computer program instructions that, when executed, cause a computer to carry out the steps of:

receiving, by a target compute node from an origin compute node, a message;

identifying, by the target compute node, one or more characteristics of the message including values which will cause a number of state changes to targeted memory in the target compute node that is greater than a predefined threshold; and controlling, by the target compute node, cooling operations in dependence upon the one or more characteristics of the message by increasing cooling operations at the targeted memory in the target compute node.

15. A computer program product for managing cooling operations in a parallel computer comprising a plurality of compute nodes, the computer program product disposed upon a non-transitory computer readable medium, the computer program product comprising computer program instructions that, when executed, cause a computer to carry out the steps of:

receiving, by a target compute node from an origin compute node, a message;

identifying, by the target compute node, one or more characteristics of the message including a memory address in a pinned memory segment of the target compute node that is associated with a particular device in the target compute node; and controlling, by the target compute node, cooling operations in dependence upon the one or more characteristics of the message by increasing cooling operations at the particular device in the target compute node.

* * * * *